United States Patent
Ayandeh

(10) Patent No.: US 10,972,396 B2
(45) Date of Patent: Apr. 6, 2021

(54) MAPPING NETWORK FRAME FLOWS TO CLASSES OF SERVICE TO MINIMIZE NETWORK FRAME FLOW DISRUPTION

(71) Applicant: Hewlett Packard Enterprise Development LP, Houston, TX (US)

(72) Inventor: Siamack Ayandeh, Andover, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/719,667

(22) Filed: Sep. 29, 2017

(65) Prior Publication Data
US 2019/0104074 A1    Apr. 4, 2019

(51) Int. Cl.
*H04L 12/851* (2013.01)
*H04L 12/801* (2013.01)
*H04L 12/725* (2013.01)

(52) U.S. Cl.
CPC ........ *H04L 47/2441* (2013.01); *H04L 45/302* (2013.01); *H04L 47/17* (2013.01)

(58) Field of Classification Search
None
See application file for complete search history.

(56) References Cited

U.S. PATENT DOCUMENTS

| | | | |
|---|---|---|---|
| 6,687,247 B1 | 2/2004 | Wilford et al. | |
| 6,789,118 B1 | 9/2004 | Rao | |
| 6,850,521 B1 | 2/2005 | Kadambi et al. | |
| 7,136,351 B2 | 11/2006 | Metin et al. | |
| 7,496,661 B1 | 2/2009 | Morford et al. | |
| 8,797,867 B1 * | 8/2014 | Chen ................... | H04L 41/5022 370/232 |
| 9,348,789 B2 | 5/2016 | Wang et al. | |

(Continued)

OTHER PUBLICATIONS

Kramer, G. et al., "Supporting Differentiated Classes of Service in Ethernet Passive Optical Networks", 2002 Optical Society of America, Journal of Optical Networking, Aug. & Sep. 2002 , vol. 1, Nos. 8 & 9 , < http://users.encs.concordia.ca/~assi/courses/encs6811/cos_jon.pdf >, pp. 280-298.

(Continued)

*Primary Examiner* — Khaled M Kassim
(74) *Attorney, Agent, or Firm* — Michael A. Dryja

(57) ABSTRACT

A network edge routing device determines a mapping between network frame flows and classes of service that minimizes network frame flow disruption during class-based network frame flow control initiated outside a network of the network edge routing device. The network edge routing device transmits the mapping to a network interior device within the network that generates the network frame flows. The network edge routing device receives the network frame flows from the network interior device from inside the network, and routes the network frame flows to outside the network.

11 Claims, 6 Drawing Sheets

(56) References Cited

U.S. PATENT DOCUMENTS

| | | | |
|---|---|---|---|
| 2002/0191622 A1* | 12/2002 | Zdan | H04L 45/308 370/401 |
| 2003/0123393 A1 | 7/2003 | Feuerstraeter et al. | |
| 2005/0047345 A1* | 3/2005 | Suh | H04N 21/64738 370/235 |
| 2005/0058068 A1* | 3/2005 | Ben Ali | H04L 47/2441 370/230 |
| 2005/0094611 A1* | 5/2005 | Cheong | H04L 47/801 370/342 |
| 2006/0203730 A1 | 9/2006 | Zur | |
| 2007/0028001 A1* | 2/2007 | Phillips | H04L 29/06 709/238 |
| 2008/0025230 A1* | 1/2008 | Patel | H04L 41/5022 370/252 |
| 2008/0037567 A1* | 2/2008 | Cho | H04L 47/2408 370/401 |
| 2008/0123660 A1* | 5/2008 | Sammour | H04L 47/14 370/395.21 |
| 2012/0327774 A1* | 12/2012 | Hernandez | H04L 47/30 370/236 |
| 2018/0324631 A1* | 11/2018 | Jheng | H04W 36/0022 |

OTHER PUBLICATIONS

"Configuring Priority Flow Control", Cisco Nexus 7000 Series NX-OS Quality of Service Configuration Guide, Release 5.x, Chapter 10, OL-23379-02, updated Jun. 8, 2017, 6 pp.

Levesque, G. et al., "Operational Practices: Deploying, Monitoring & Troubleshooting Performance Assured Business Services over DOCSIS", Society of Cable Telecommunications Engineers, Cable Tec Expo, Oct. 13-16, 2015, 60 pp.

Orawiwattanakul, T., "JGN-X Automated Resource Provisioning (JARP)", Dec. 2014, < http://www.jgn.nict.go.jp/a/utilization/theme-2.html >, 2 pp.

Customer Pre-Installation Guide, Level 3 MPLS/IP VPN, Internet Services (IS) and Managed Network Services (MNS), Level 3 Communications, 2016, 19 pp.

Implementation Agreement, MEF 23.1, Carrier Ethernet Class of Service, Phase 2, Jan. 2012, 102 pp.

Verschoore De La Houssaye, J. et al., "Integrated QoS Management", NGMN Alliance, Version 1.3, Dec. 12, 2012, 43 pp.

Best Practices: Multiple Classes of Service in Carrier Ethernet Mobile Backhaul Networks, MEF, Apr. 2013, 21 pp.

The Benefits of Multiple Classes of Service for Ethernet Mobile Backhaul, Version 1.0, MEF, Jan. 2012, 16 pp.

* cited by examiner

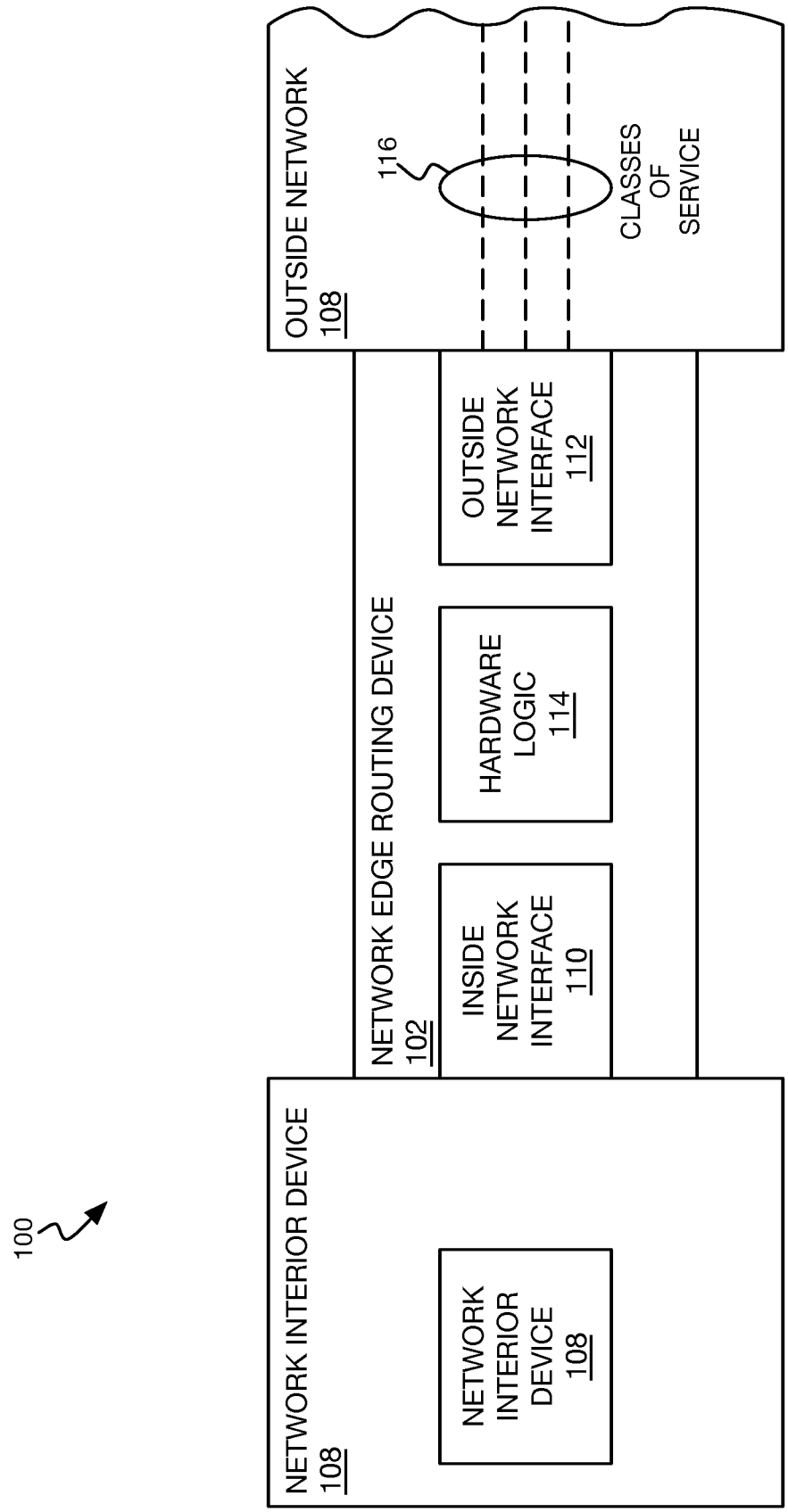

MAPPING NETWORK FRAME FLOWS TO CLASSES OF SERVICE TO MINIMIZE NETWORK FRAME FLOW DISRUPTION

BACKGROUND

Computing devices of all types are commonly interconnected to one another via networks. Within enterprise and other such environments, a data center at one physical location may have to communicate with a data center at another physical location. Each data center may have its own network. The networks of different data centers may be interconnected to one another via a backhaul network.

BRIEF DESCRIPTION OF THE DRAWINGS

FIG. 1 is a diagram of an example network architecture in which a network edge routing device can route network frame flows provided by a network interior device within an inside network onto an outside network with classes of service.

DETAILED DESCRIPTION

Figure 2A:
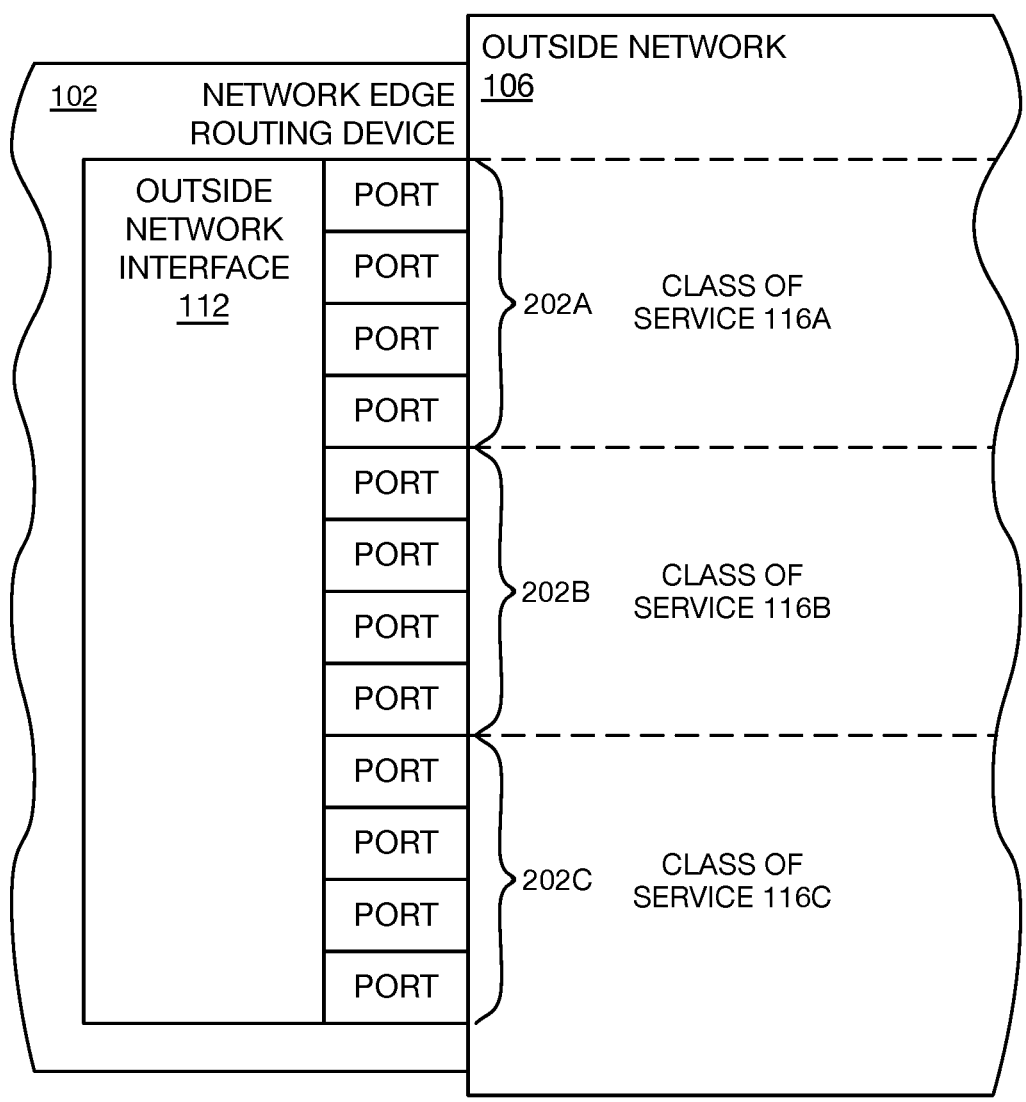
FIGS. 2A and 2B are diagrams of different example mappings of network frame flows to classes of service, with FIG. 2A illustrating an example mapping by network port and FIG. 2B illustrating an example mapping by network destination.

As noted in the background section, networks at different physical locations may be interconnected to one another via a backhaul network. A transmitting computing device may be located within one network, and a receiving computing device may be located within another network. Each network may have a corresponding network edge routing device that connects the network to a backhaul network. Therefore, the transmitting computing device sends data to the network edge routing device of its network, which in turn routes the data over the backhaul network. The network edge routing device of the network including the receiving computing device receives the data, and transmits the data to the receiving computing device.

The network edge routing device at the receiving end may signal to the network edge routing device at the transmitting end when network congestion is occurring that prevents the former routing device from properly receiving data from the latter routing device. The receiving network edge routing device signals to the transmitting network edge routing device to pause data transmission, so that no data is lost (i.e., to ensure lossless or near lossless data transmission). When the network congestion passes, the receiving network edge routing device signals to the transmitting network edge routing device to resume data transmission. This methodology is known as priority flow control (PFC).

Different types of data have different sensitivities to network congestion. For example, real-time telephony and audio and video conferencing applications are more sensitive to network congestion than streaming audio and video applications, which are themselves more sensitive to network congestion than the downloading of data files. To distinguish among different such different types of data, a network edge routing device may able to assign different classes of service (CoS) to different data flows. The backhaul network may therefore prioritize conveyance of data according to the classes of service assigned to the data.

Priority flow control has been extended to the level of granularity that classes of service afford. For instance, a receiving network edge routing device can signal to a transmitting network edge routing device to pause data transmission on a class of service-by-class of service basis. The combination of classes of service and priority flow control thus can provide for better management of scarce backhaul network bandwidth while ensuring lossless or near lossless data communication.

Techniques described herein leverage class-based network frame flow control—such as class of service-aware priority flow control—to minimize data flow disruption when such flow control is initiated, which in turn can maximize throughput out of a network edge routing device. In particular, the techniques described herein enable a network edge routing device to inform a computing device inside its network how to map flows to classes of service. Without this information, the computing device may not optimally assign classes of service to the data flows that it generates, which can result in non-optimal data flow disruption when flow control is initiated and, correspondingly, non-optimal throughput out of the network edge routing device.

For example, a network edge routing device may have a number of outside network ports that connect to a backhaul network. If a computing device inside the network assigns classes of service to data flows in a manner that does not take into account the network ports, the failure of one network port can disrupt the data flows of multiple classes of service. By comparison, if the computing device assigns each network port with a corresponding class of service, the failure of one network port affects just the data flows of one class of service, and not the data flows of the other classes of services that correspond to different network ports.

In this example, then, the techniques described herein provide a mechanism by which the network edge routing device can inform the computing device how to map data flows to classes of service, specifically by the network ports at which the data flows will exit the network edge routing device. Conventionally, the computing device has no way to receive this information. By providing this capability, class of service-aware priority flow control can minimize data flow disruption, and maximize throughput out of a network edge routing device, when network congestion occurs.

FIG. 1 shows an example network architecture 100. The network architecture 100 includes a network edge routing device 102, such as a network router, that is located at an edge of an inside network 104, and which communicatively connects the inside network 104 to an outside network 106. The inside network 104 may be the network at a datacenter at one physical location, for instance, such as a local-area network (LAN) or an intranet. The outside network 106 may be a backhaul network that is connected to one or more other datacenters, such as one or more other LANs or intranets.

Devices within the network 104 thus communicate with devices outside the network via such communication being routed through the network edge routing device 102 and onto the outside network 106. In FIG. 1, one such network interior device 108 within the inside network 104 is depicted. The network interior device 108 may be a computing device, such as a server computing device. The network interior device 108 can communicate with other devices within the network 104 without utilization of the network edge routing device 102. However, to communicate with devices outside the network 104, such as devices within other datacenters, LANs, or intranets connected to the outside network 106, the network interior device 108 communicates through the network edge routing device 102.

The network edge routing device 102 includes an inside network interface 110 that is communicatively connected to the inside network 104, and an outside network interface 112 that is connected to the outside network 106. The inside network interface 110 may include a number of number of (inside) network ports that physically connect to the inside network 104, for instance, and the outside network interface 112 may include a number of (outside) network ports that physically connect to the outside network 106. The network edge routing device 102 further includes hardware logic 114.

At the outside network interface 112, the network edge routing device 102 is able to tag outgoing network frames of different network frame flows with different classes of service 116. The classes of service 116 can signify different prioritization among the outgoing network frame flows, for instance. A network frame flow is a series or sequence of network frames. The outside network 106 may treat different classes of service 116 of network frame flows differently, based on the prioritization accorded to these classes. The classes of service 116 may be classes of service as defined by the IEEE 802.11Q standard.

When the network edge routing device 102 is sending network frames of network frame flows over the outside network 106 to, for instance, a destination network edge routing device, the destination device can initiate class-based network frame flow control, such as priority flow control as defined by the IEEE 802.1Qb standard, on a class of service basis. That is, a destination device can send a priority flow control pause frame to the network edge routing device 102 to temporarily pause the flow of network frames belonging to a particular class of service 116. The network edge routing device 102 correspondingly stops (i.e., suspends) the network frames tagged with this class of service 116, but not network frames tagged with other classes of service 116. When the network edge routing device 102 receives a priority flow control resume frame from the destination device, the device 102 resumes transmission of the network frames of this class of service 116.

When generating network frames for transmission from the inside network 104 and through the outside network 106 via the network edge routing device 102, the network interior device 108 can tag each network frame with a class of service 116 depending on the network frame flow to which the network frame belongs. Such tagging may be direct or indirect. Direct tagging can include the network interior device 108 explicitly tagging a network frame with a particular class of service. Indirect tagging can include the network interior device 108 tagging a network frame with a quality of service (QoS) or some other attribute that may be mapped to a corresponding class of service. In either case, the network edge routing device 102 can route class of service 116-tagged network frames received at the inside network interface 110 from the network interior device 108 onto the outside network 106 at the outside network interface 112.

The hardware logic 114 of the hardware edge routing device 102 determines a mapping between network frame flows and classes of service 116 that minimizes network frame flow disruption when class-based network frame flow control, such as priority flow control, is initiated at the outside network 106 (i.e., outside the network 104). The hardware logic 114 transmits this mapping to the network interior device 108 within the inside network 104. Providing this information from the network edge routing device 102 to the network interior device 108 ensures that the network interior device 108 can intelligently (directly or indirectly) tag its generated network frames with classes of service 116 that minimize network frame flow disruption when class-based network frame flow control is initiated. Without this information, the network interior device 108 has no way of knowing how to tag network frame flows so that when class-based network frame flow control occurs, disruption of flows of network frames is minimized.

As such, once the network interior device 108 receives the optimal mapping of network frame flows to classes of service 116 from the network edge routing device 102, the network interior device 108 tags each network frame that it generates with a class of service 116 according to this mapping. That is, the network interior device 108 groups the network frames into network frame flows by the classes of service 116 dictated by the that the network edge routing device 102 provided. The network interior device 108 then transmits the optimally class of service 116-tagged network frames to the network edge routing device 102 within the inside network 104, and the network edge routing device 102 receives the network frames at the inside network interface 110.

The network edge routing device 102 then routes the network frames as tagged with the classes of service 116 onto the outside network 106 at the outside network interface 112. Priority flow control or other network frame flow control may subsequently be initiated on a class of service basis within the outside network 106. In such case, network frame flow disruption is minimized because the network interior device 108 optimally tagged the network frames with classes of service 116 in accordance with the determined mapping that the network edge routing device 102 provided to the network interior device 108.

The network edge routing device 102 can provide the network frame flow to class of service 116 mapping to the network interior device 108 by encoding the mapping within a response packet sent to the network interior device 108 that is unrelated to the classes of service 116. For example, the network interior device 108 may periodically send an address resolution protocol (ARP) request packet to the network edge routing device 102 to resolve a network address within the outside network 106. The network edge routing device 102 can encode the mapping within the ARP response packet, which is unrelated to the classes of service 116. As another example, the network interior device 108 may periodically send a domain name services (DNS) request packet to the network edge routing device 102 to receive identification of the DNS server(s) related to the outside network 106. The network edge routing device 102 can encode the mapping within the DNS response packet, which is also unrelated to the classes of service 116.

Figure 2B:
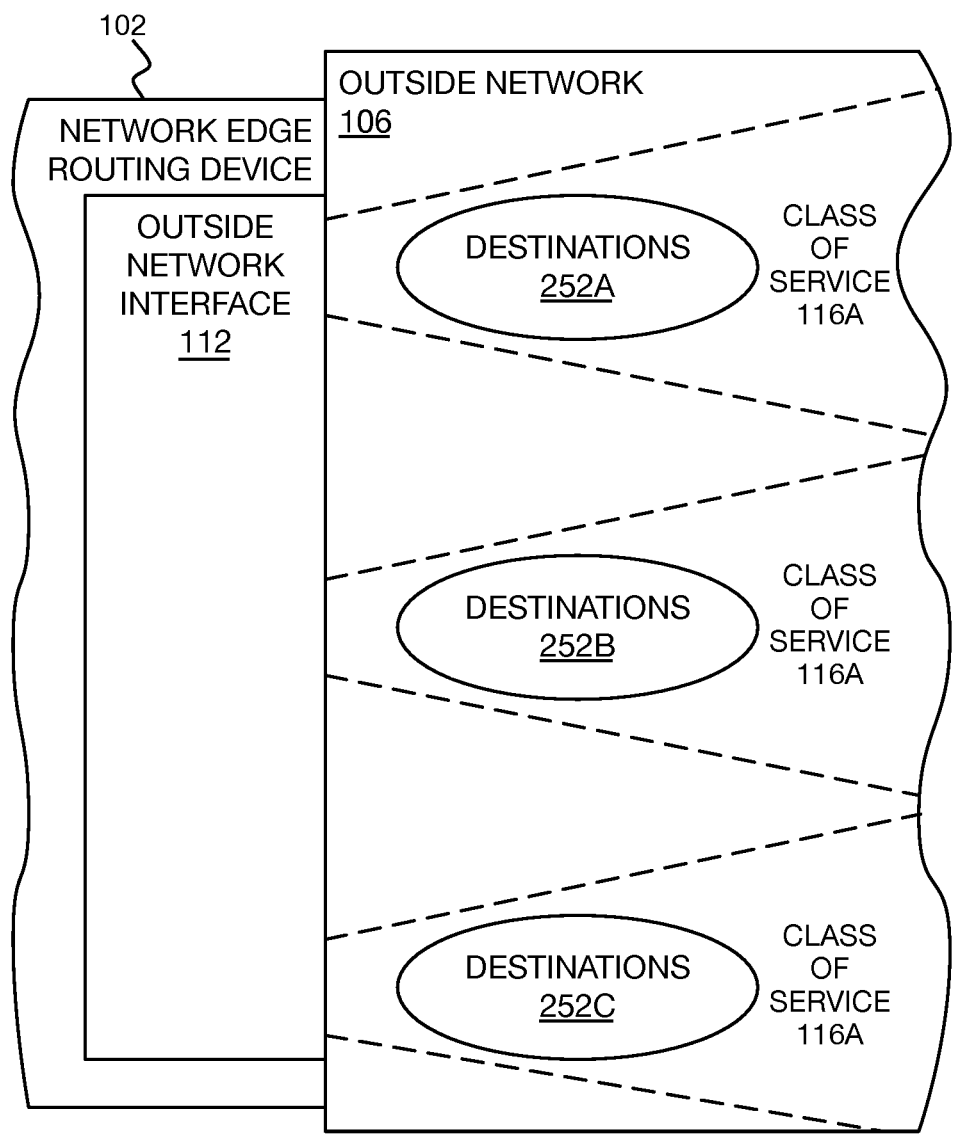

FIGS. 2A and 2B depict two example ways in which network frame flows can be mapped to classes of service 116. In the example of FIG. 2A, the outside network interface 112 of the network edge routing device 102 includes outside network ports 201 that are grouped into network port groups 202A, 202B, and 202C, which are collectively referred to as the port groups 202. The network ports 201 connect the network edge routing device 102 to the outside network 106. The network edge routing device 102 maps each network port group 202 to a different class of service 116. Thus, the network ports 201 of the port group 202A are mapped to the class of service 116A, the network ports 201 of the port group 202B are mapped to the class of service 116B, and the network ports 201 of the port group 202C are mapped to the class of service 116C. The classes of service 116A, 116B, and 116C are collectively referred to as the classes of service 116.

This mapping can minimize network frame flow disruption during class-based network frame flow control, such as class-based priority flow control, initiated at the outside network 106. For example, if the mapping of FIG. 2A were not provided to the network interior device 108 of FIG. 1, the network interior device 108 may group network frames that are to be output at both one of the network ports 201 of the port group 202A and one of the network ports 201 of the port group 202B within the same network frame flow. As such, priority flow control affecting either the port group 202A or the port group 202B causes the network frame flow as a whole to be disrupted. This is because the network frames are effectively divided over two classes of service 116A and 116B.

By comparison, with the mapping of FIG. 2A provided to the network interior device 108, the network interior device 108 would know to group network frames that are output at the network ports 201 of the port group 202A within a different network frame flow (and thus a different class of service 116) than those that are output at the network ports 201 of the port group 202B. Therefore, priority flow control affecting the class of service 116A for the port group 202A does not affect the network frame flow output at the network ports 201 of the port group 202B, because the network frames of this flow are assigned the class of service 116B. Similarly, priority flow control affecting the class of service 116B for the port group 202B does not affect the network frame flow output at the network ports 201 of the port group 202A, because the network frames of this flow are assigned the class of service 116A. Network frame flow disruption during class-based network frame flow control is minimized.

In the example of FIG. 2B, network frame flows output at the outside network interface 112 of the network edge routing device 102 onto the outside network 106 are mapped to classes of service 116 by their network destinations 252A, 252B, and 252C, which are collectively referred to as the destinations 252. Specifically, the network frames destined for any destination within the network destinations 252A are mapped the class of service 116A. The network frames destined for any destination within the network destinations 252B are mapped to the class of service 116B. The network frames destined for any destination within the network destinations 252C are mapped to the class of service 116C.

This mapping can also minimize network frame flow disruption during class-based network frame flow control, such as class-based priority flow control, initiated at the outside network 106. For example, if the mapping of FIG. 2B were not provided to the network interior device 108 of FIG. 1, the network interior device 108 map group network frames that are destined for a first destination within the destinations 252A and a second destination within the destinations 252B within the same network frame flow. As such, priority flow control initiated from either the first destination or the second destination causes the network frame flow as a whole to be disrupted, because the network frames are effectively divided over two classes of service 116A and 116B.

By comparison, with the mapping of FIG. 2B provided to the network interior device 108, the network interior device 108 would know to group network frames that are destined for a destination within the destinations 252A within a different network frame flow (and thus a different class of service 116) than those that are destined for a destination within the destinations 252B. Therefore, priority flow control affecting the class of service 116A initiated at the destination within the destinations 252A does not affect the network frame flow destined for the destination within the destinations 252B. Similarly, priority flow control affecting the class of service 116B initiated at the destination within the destinations 252B does not affect the network frame flow control destined for the destination within the destinations 252A. Network frame flow disruption during class-based network frame flow control is minimized.

The mappings of FIGS. 2A and 2B are two examples as to how network frame flows can be mapped to classes of service 116, with the mapping of FIG. 2A being by network port, and the mapping of FIG. 2B being by network destination. In FIG. 2A, the hardware logic 114 of the network edge routing device 102 groups the outgoing network ports 201 into network port groups 202 that are equal in number to the classes of service 116, and assigns each port group 202 to a different class of service 116. The network interior device 108 after receiving this mapping assigns network frames for routing by the network edge routing device 102 with the classes of service 116 in accordance with the outgoing network ports 202 of the network frames that it generates.

In FIG. 2B, the hardware logic 114 of the network edge routing device 102 groups the network destinations that can be reached by the device 102 through the outside network 106 into groups of network destinations 252 equal in number to the classes of service. Each group of network destinations 252 is assigned a different class of service 116. The network interior device 108 after receiving this mapping assigns network frames for routing by the network edge routing device 102 with the classes of service 116 in accordance with the network destinations 252 of the network frames that it generates.

In both FIGS. 2A and 2B, the network interior device 108, via the network frame flow to class of service mapping received from the network edge routing device 102, can intelligently assign network frames to network frame flows and correspondingly intelligently assign them with classes of service 116. Besides minimizing network frame flow disruption during class-based network frame flow control, such intelligent network frame group and tagging using the provided mappings also maximize network frame flow throughput at the network edge routing device 102 when such flow control occurs. Without this information, the network interior device 108 has no way of knowing how to group network frames into flows and how to tag the network frames with classes of service 116.

The network edge routing device 102 may be preconfigured to use the mapping of FIG. 2A, the mapping of FIG. 2B, or another mapping, and provide this information to the network interior device 108 for usage. The network edge routing device 102 may further permit an administrator to select (or provide) a mapping. The network edge routing device 102 may determine based on how its connected to the outside network 106 and based on other factors the optimal way to map network frame flows to classes of service, so that the network interior device 108 can properly group generated network frames into flows and thus tag them with classes of service 116.

Figure 3:
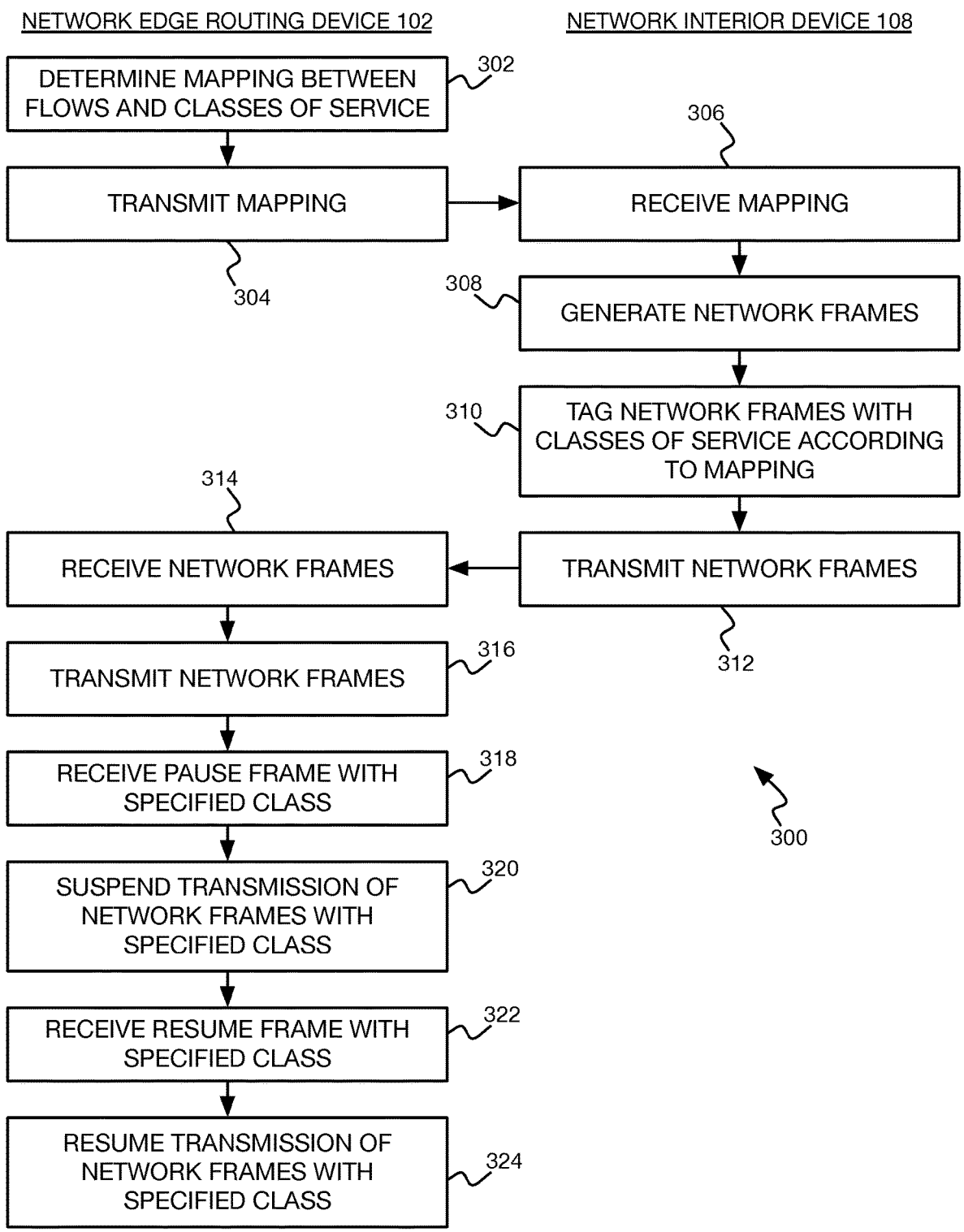
FIG. 3 is a flowchart of an example method in which a network edge routing device routes network frame flows provided by a network interior device within an inside network onto an outside network with classes of service.

FIG. 3 shows an example method 300. The method 300 is divided into two columns. Parts of the method 300 in the left column are performed by the network edge routing device 102. Parts of the method 300 in the right column are performed by the network interior device 108. The method 300 can be implemented as program code stored on a non-transitory computer-readable data storage medium and executable by the device 102 or 108. For instance, an application-specific integrated circuit (ASIC) or another type of integrated circuit of the device 102 or 108 may implement and execute the program code. As another example, a general-purpose processor may execute the program code as stored on a memory.

The network edge routing device 102 determines a mapping between network frame flows and classes of service (302), as has been described. The mapping may specify classes of service according to outgoing network ports, network destinations on the outside network 106, and so on. The network edge routing device 102 transmits the mapping to the network interior device 108 (304), which receives the mapping (306). As noted above, the network interior device 108 may send a request packet unrelated to the mapping, such as a DNS or an ARP request packet, and in response the network edge routing device 102 may also encode the mapping within the corresponding response packet, and transmit the response packet to the network interior device 108.

The network interior device 108 generates network frames within network frame flows (308). The network interior device 108 tags the network frames with classes of service according to the received mapping between network frame flows and classes of services (310). The network frames include destinations reachable on the outside network 106. The network interior device 108 then transmits the network frames to the network edge routing device 102 over the inside network 104 (312). Upon receipt of the network frames (314), the network edge routing device 102 can transmit the network frames to their destinations over the outside network 106 (316).

However, periodically the network edge routing device 102 may receive a priority flow control pause frame on the outside network 106 specifying a particular class of service (318). The pause frame may be received from another network edge routing device, for instance, which is detecting congestion of the receipt of network frames of the class of service in question. In response, the network edge routing device 102 temporarily suspends transmission of packets having this class of service over the outside network (320), until a corresponding priority flow control resume frame specifying the particular class of service is received on the outside network 106 (322). At this time, the network edge routing device 102 responsively resumes transmission of network frames with the class of service in question (324).

Classes of service have been described in relation to a network edge routing device 102 that determines a mapping between the classes of service and network frame flows, and provides the mapping to a network interior device 108 so that the network interior device 108 intelligently tags its generated network frames with classes of services. The network edge routing device 102 then transmits the tagged network frames onto the outside network 106 to their destination. However, in actuality the network frames may hop across one or more intermediate network hop devices within the outside network 106 until the frames reach their destination. In such instances, there can be a different selected class of service on each hop, and the classes of services that are available at each hop can differ from one another.

Figure 4:
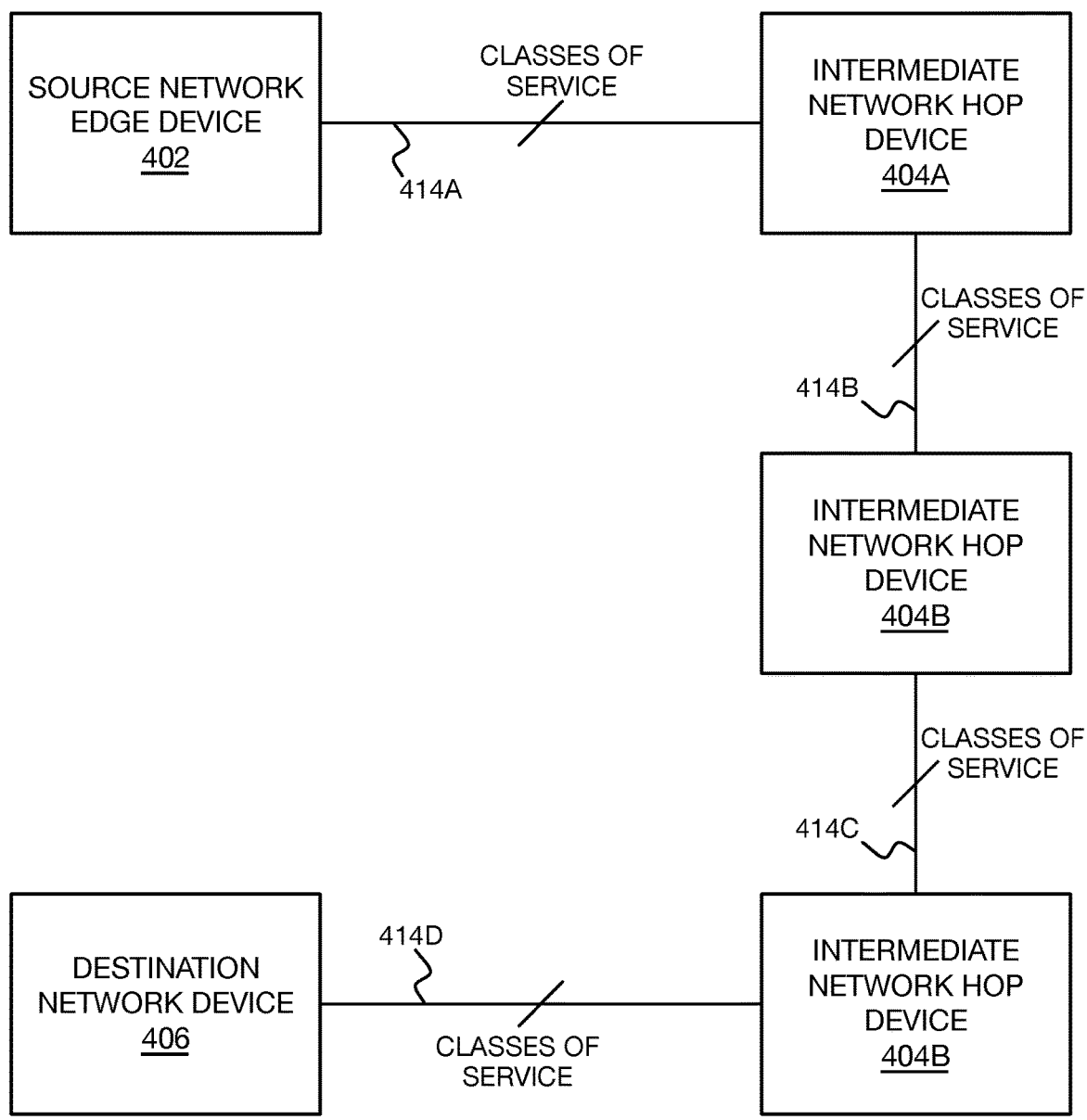
FIG. 4 is a diagram of an example multiple-hop scenario in which network frames can be tagged with different classes of service as the frames hop across network segments.

FIG. 4 shows an example multiple-hop scenario 400 including a source network edge device 402 that transmits network frames over three intermediate network hop devices 404A, 404B, and 404C, which are collectively referred to as the intermediate network hop devices 404, so that the frames reach their destination network device 406. Each of the devices 402, 404, and 406 may be a network edge routing device like the network edge routing device 102 that has been described. That is, each device 402, 404, and 406 may have its own internal network, but are communicatively connected to one another over an outside network having network segments 414A, 414B, 414C, and 414D, which are collectively referred to as the network segments 414. In the example of FIG. 4, there are three intermediate network hop devices 404, but in a multiple-hop scenario, there can be as few as one such intermediate network hop device 404.

The source network edge device 402 may receive network frames from a network interior device like the network interior device 108 that has been described. The network segment 414A connects the source network edge device 402 to the intermediate network hop device 404A, and there are classes of service associated with the segment 414A. The classes of service with which the network frames are tagged by the network interior device generating the frames and as transmitted by the source network edge device 402 are associated with the network segment 414A. The intermediate network hop device 404A is a device that may send priority flow control pause and resume frames in relation to these classes of service over the network segment 414A.

Although the intermediate network hop device 404A may have its own inside network, it can retransmit the network frames received from the source network edge device 402 that are intended for the destination network device 406 within the outside network, on the network segment 414B. That is, the intermediate network hop device 404A may not transmit these received network frames within its internal network. Furthermore, the intermediate network hop device 404A may retag the network frames prior to retransmission according to different classes of service that are associated with the network segment 414B. Even if the classes of service associated with the network segment 414B are the same as the classes of service associated with the network segment 414A, the intermediate network hop device 404A may select a different class of service for a particular network frame when transmitting the frame on the network segment 414B as compared to the class of service with which the frame was tagged for transmission over the network segment 414A.

The intermediate network hop device 404B receives the network frames from the intermediate network hop device 404A, and may send priority flow control pause and resume frames in relation to the classes of service with which the network frames are tagged on the network segment 414B. The intermediate network hop device 404B may also have its own inside network, but transmits the network frames in the scenario 400 received from the intermediate network hop device 404A that are intended for the destination network device 406 within the outside network, on the segment 414C. The intermediate network hop device 404B may also retag the network frames prior to retransmission according to different classes of service that are associated with the network segment 414C, or may at least select a different class of service for a particular network frame as compared to the class of service with which the frame was tagged for transmission over the network segment 414B.

The intermediate network hop device 404C receives the network frames from the intermediate network hop device 404B, and may send priority flow control pause and resume frames in relation to the classes of service with which the network frames are tagged on the network segment 414C. The intermediate network hop device 404C similarly may have its own inside network, but transmits the network frames in the scenario 400 received from the intermediate network hop device 404B that are intended for the destination network device 406 within the outside network, on the segment 414D. The intermediate network hop device 404C may similarly retag the network frames prior to retransmission according to different classes of service that are associated with the network segment 414D, or may at least select a different class of service for a particular network frame as compared to the class of service with which the frame was tagged for transmission over the network segment 414C.

The destination network device 406 finally receives the network frames from the intermediate network hop device 404C, which were generated at the inside network of the source network edge device 402. The destination network device 406 can send priority flow control pause and resume frames in relation to the classes of service with which the network frames are tagged on the network segment 414D. The network frames that the destination network device 406 receives may be intended for a network interior device of the destination network device 406, which may be a network edge routing device. As such, the destination network device 406 transmits the received network frames over its inside network to the recipient network interior device.

In the multiple-hop scenario 400 of FIG. 4, then, there can be different classes of service associated with each network segment 414, including different numbers of such classes of services. At a minimum, a network frame that is generated at the inside network of the source network edge device 402 for receipt at the destination network device 406 may be tagged with a different class of service on each network segment 414 (that is, on each hop). On the network segment 414A, the source network edge device 402 effectively tags the network frames with classes of service, pursuant to the tagging performed by the network interior device within the source network edge device 402 that generated the frames, and the intermediate network hop device 404A can perform priority flow control in relation to these frames.

On the network segment 414B, the intermediate network hop device 404A can tag the network frames with classes of service, and the intermediate network hop device 404B can perform priority flow control. On the network segment 414C, the intermediate network hop device 404B can tag the network frames with classes of service, and the intermediate network hop device 404C can perform priority flow control. On the network segment 414D, the intermediate network hop device 404C can tag the network frames with classes of service, and the destination network device 406 can perform priority flow control.

The scenario 400 that has been described can be implemented in accordance with a software-defined networking (SDN) topology, such as the OpenFlow SDN topology. In such instance, the source network edge device 402, the intermediate network hop devices 404, and the destination network device 406 can each be a data-forwarding device within a data-forwarding plane. Each data-forwarding device is further controllable by a controlling device within a control plane. In this implementation, the mappings of network frame flows to classes of service can be maintained and/or determined by the controlling device. The mapping that a particular data-forwarding device is to use is thus communicated by the controlling device to the data-forwarding device. As such, although the data-forwarding devices still change the classes of service accorded to network frames that they transmit, the actual mappings that dictate these changes can be determined or at least maintained by the controlling device in a centralized manner.

Figure 5:
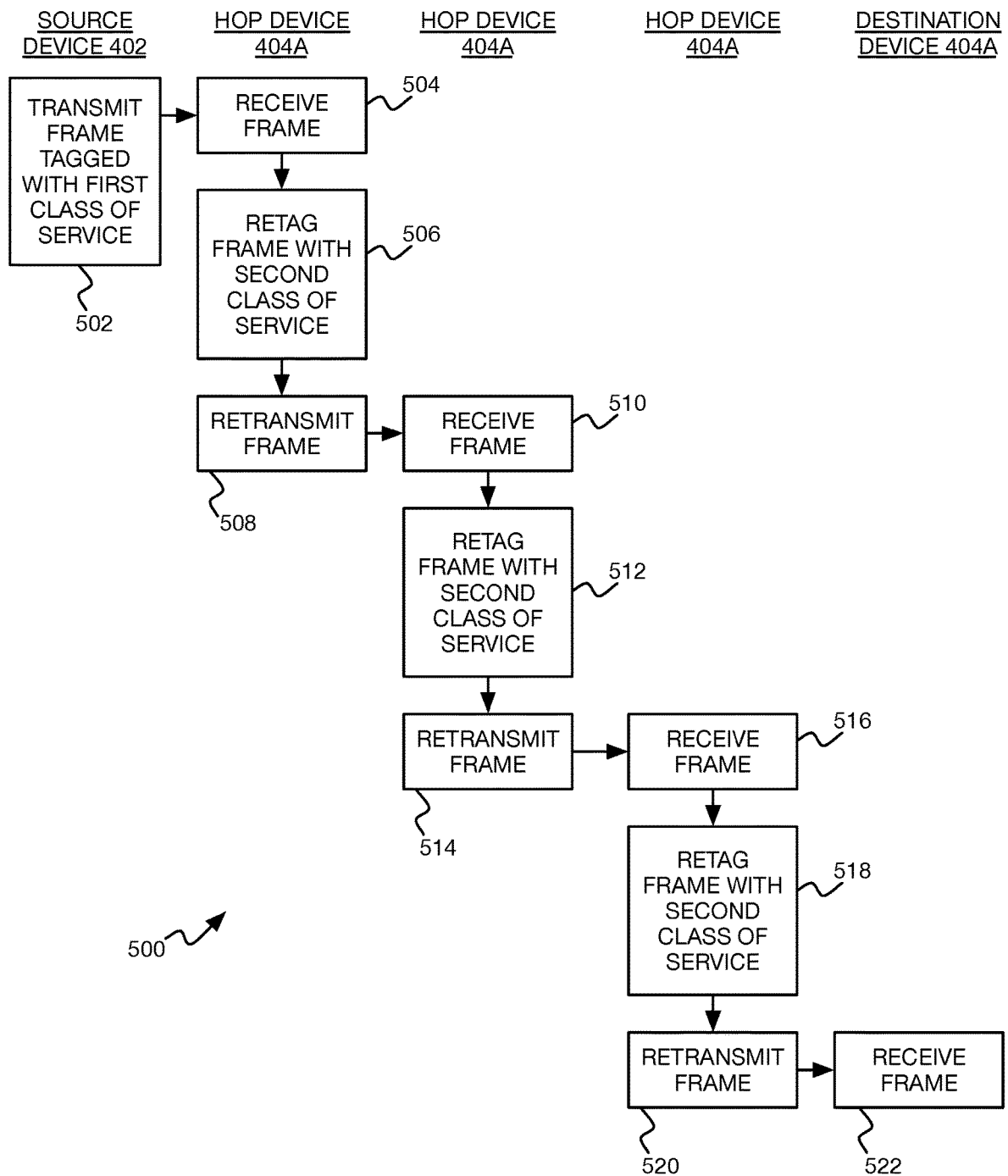
FIG. 5 is a flowchart of an example method of a multiple-hop scenario in which network frames can be tagged with different classes of service as the frames hop across network segments.

FIG. 5 shows an example method 500 of the multiple-hop scenario 400. In the method 500, the source network edge device 402 transmits, on a network hop of an outside network to the intermediate network hop device 404A, a network frame generated with the inside network of the source network edge device 402. The network frame is tagged with a class of service that minimizes network frame flow disruption during class-based network frame flow control performed at the source network edge device 402, as may be initiated downstream by the intermediate network hop device 404A.

The intermediate network hop device 404A next receives the network frame (504). The intermediate network hop device 404A can retag the frame with a different class of service that minimizes network frame flow disruption during class-based network frame flow control performed at the intermediate network hop device 404A, as may be initiated downstream by the intermediate network hop device 404B (506). The intermediate network hop device 404A retransmits the network frame on a different network hop of the outside network to the intermediate network hop device 404B (508).

The intermediate network hop device 404B then receives the network frame (510). The intermediate network hop device 404B can also retag the frame with a different class of service, which minimizes network frame flow disruption during class-based network frame flow control performed at the intermediate network hop device 404B, as may be initiated downstream by the intermediate network hop device 404C (512). The intermediate network hop device 404B retransmits the network frame on another network hop of the outside network to the intermediate network hop device 404C (514).

The intermediate network hop device 404C then receives the network frame (516). The intermediate network hop device 404C can further retag the frame with a different class of service, which minimizes network frame flow disruption during class-based network frame flow control performed at the intermediate network hop device 404C, as may be initiated downstream by the destination network device 406 (518). The intermediate network hop device 404C retransmits the network from on another network hop of the outside network to the destination network device 406 (520), which receives the network frame originated at the source network edge device 402 (522).

In the method 500, the intermediate network hop device 404B may provide a mapping of network frame flows to classes of service on the network hop between the intermediate network hop devices 404A and 404B to the intermediate network hop device 404A. This mapping thus can ensure that the intermediate hop device 404A intelligently selects which class of service to tag each network frame flow when retransmitting network frames to the intermediate network hop device 404B. Similarly, the intermediate network hop device 404C may provide a mapping of network frame flows to classes of service on the network hop between the intermediate network hop devices 404B and 404C to the intermediate network hop device 404B. This mapping can ensure that the intermediate hop device 404B intelligently selects which class of service to tag each network frame flow when retransmitting network frames to the intermediate network hop device 404C. Also similarly, the destination network device 406 may provide a mapping of network frame flows to classes of service on the network hop between the intermediate network hop device 404C and the destination network device 406, so that the former device intelligently selects which class of service to tag each flow when retransmitting frames to the latter device.

The techniques that have been described herein therefore provide for intelligent tagging of classes of service to network frame flows. Such intelligent tagging can minimize network frame flow disruption when class-based network frame flow control is initiated. The intelligent tagging can likewise maximize network frame flow throughput when such class-based network frame flow control occurs.

I claim:

1. A network edge routing device for a network, comprising:
   an inside network interface to receive network frames from inside the network; an outside network interface to transmit the network frames to outside the network; and hardware logic to:
   determine a mapping between network frame flows and classes of service that minimizes network frame flow disruption during class-based network frame flow control initiated outside the network; and
      transmit the mapping to a network interior device within the network that generates the network frame flows and transmits the network frame flows to the network edge routing device, the network edge routing device receiving the network frame flows at the inside network interface and routing the network frame flows at the outside network interface;
      wherein determining the mapping comprises:
      grouping a plurality of network destinations into a plurality of destination groups equal in number to the classes of service; and
      assigning each destination group of the network destinations to a different one of the classes of service, thereby allowing the network interior device to assign a plurality of network frames for routing by the network edge routing device with the classes of service in accordance with the network destinations of a plurality of flows of the network frame;
      wherein the outside network interface comprises a plurality of outside network ports, and wherein determining the mapping comprises:
      grouping the plurality of outside network ports into a number of port groups; and
      mapping each port group to a different class of service, thereby facilitating the network interior device to generate a class-of-service tag for each network frame based on the mapping.

2. The network edge routing device of claim 1, wherein hardware logic is further to:
   receive a plurality of network frames from the network interior device at the inside network interface, each network frame having a network destination and tagged with a class of service according to the mapping that the network edge routing device provided to the network interior device; and
   route each network frame to the network destination thereof at the outside network interface with the class of service with which the network interior device tagged the network frame.

3. The network edge routing device of claim 2, wherein the hardware logic is further to:
   receive a priority flow control pause frame at the outside network interface indicating a particular class of service;
   responsive to receiving the priority flow control pause frame, suspend routing of the network frames from the network edge routing device at the outside network interface that are tagged with the particular class of service;
   after suspending transmission, receive a priority flow control resume frame at the outside network interface indicating the particular class of service; and
   responsive to receiving the priority flow control resume frame, resume routing of the network frames at the outside network interface that are tagged with the particular class of service.

4. The network edge routing device of claim 1, wherein the mapping between the network frame flows and the classes of services maximizes network frame flow throughput out of the network edge routing device at the outside network interface in addition to minimizing the network frame flow disruption during the class-based network frame flow control initiated outside the network.

5. The network edge routing device of claim 1,
   wherein the outside network ports are grouped into a plurality of port groups equal in number to the classes of service; and
   wherein the network interior device assigns a plurality of network frames for routing by the network edge routing device with the classes of service in accordance with the outside network ports of a plurality of flows of the network frames.

6. The network edge routing device of claim 1, wherein the hardware logic is to transmit the mapping to the network interior device over the inside network interface by:
   encoding the mapping within a response packet to the network interior device that is unrelated to the classes of service.

7. The network edge routing device of claim 1, wherein the class-based network frame flow control is IEEE 802.1Qb priority flow control (PFC), and the classes of service are IEEE 802.1Q classes of service.

8. A non-transitory computer-readable data storage medium storing program code executable by a network interior device of a network to:
   receive, from a network edge routing device that routes network frames to outside the network, a mapping between network frame flows and classes of service that minimizes network frame flow disruption during class-based network frame flow control initiated outside the network, wherein the network edge routing device comprises an outside network interface comprising a plurality of outside network ports, wherein the plurality of outside network ports are grouped into a number of port groups, and wherein the received mapping comprises corresponding relationships between different port groups and different class of services;
   generate a plurality of network frames, each network frame having a network destination;
   tag each network frame with a class of service according to the mapping that the network edge routing device provided, based on the network frame flow to which the network frame belongs; and
   transmit each network frame to the network edge routing device, the network edge routing device routing the network frame to outside the network to the network destination thereof with the class of service with which the network interior device tagged the network frame; wherein a plurality of network destinations are grouped into a number of destination groups, wherein the received mapping comprises corresponding relationships between different destination groups and different class of services, and wherein the network edge routing device is to tag each network frame with the class of service according to the mapping, based on the network destination of the network frame flow to which the network frame is assigned.

9. The non-transitory computer-readable data storage medium of claim 8, wherein the mapping between the network frame flows and the classes of services maximizes network frame flow throughput out of the network edge routing device in addition to minimizing the network frame flow disruption during the class-based network frame flow control initiated outside the network.

10. The non-transitory computer-readable data storage medium of claim 8, wherein the network interior device is to tag each network frame with the class of service according to the mapping, based on an outside network port of the network edge routing device to which the network frame flow of the network frame is assigned.

11. The non-transitory computer-readable data storage medium of claim 8, wherein the network interior device is to receive the mapping by:

transmitting a request packet to the network edge device unrelated to the classes of services;

receiving a response packet from the network edge device that is responsive to the request packet and in which the mapping is encoded.

\* \* \* \* \*